Patented Oct. 9, 1923.

1,469,773

UNITED STATES PATENT OFFICE.

WILLIAM STAKELY COX, OF COLLEGE PARK, GEORGIA.

INSECTICIDE.

No Drawing.    Application filed April 25, 1921.    Serial No. 464,389.

*To all whom it may concern:*

Be it known that I, WILLIAM STAKELY Cox, a citizen of the United States, residing at College Park, in the county of Fulton and State of Georgia, have invented a new and useful Insecticide for Destroying the Cotton Boll Weevil and Other Injurious Insects, of which the following is a specification.

My invention relates to a composition of matter for use as an insecticide particularly adapted for use on growing plants, such as cotton plants, to destroy insect life thereon, such as the boll weevil. The invention has for its object to provide a composition or mixture which may readily be mixed with water and applied to the plants in the form of spray which does not injure the plants and which, when so applied will give off a gas heavier than air which, when used on cotton plants, will penetrate the buds, squaris or bolls and destroy the grub or larva of the weevil, and will also leave on the exterior of the buds, squaris or bolls and on the foliage of the plants a deposit of slightly soluble poisonous matter destructive to insect life which would otherwise feed on and destroy it.

With the above objects in view my invention consists in the mixture or composition of matter hereinafter described and claimed.

In preparing the mixture or composition of my invention I take what is commonly known as chloride of lime which, as is well known, carries a considerable proportion of calcium hypochlorite, $Ca(ClO)_2$, and mix with it Paris green, using the ingredients in the proportion of 80 to 85 per cent of the chloride of lime and 20 to 15 per cent of Paris green.

For use this composition is mixed with water in the proportion of about one pound of the dry compound to from 7 to 10 gallons of water and applied in the form of spray with any convenient spraying apparatus, to the tops of the plants. The compound may be readily maintained in suspension by frequent stirring or agitation and to a slight extent at least, both ingredients are dissolved in the water. As the spray reaches the plants and is subjected to the action of the atmosphere the water evaporates leaving the undissolved ingredients as a deposit on the plants. From the portion of the ingredients which is dissolved chlorine is at once set free and from the undissolved deposit on the leaves and other portions of the plant chlorine continues to be set free, for a considerable time, by the action of the atmosphere aided, probably, by more or less reaction between the acids of the Paris green and the chloride of lime. The chloride thus set free, being heavier than air, tends to settle about the plants and envelop them in an atmosphere which is destructive of insect life and by reason of its penetrating qualities is destructive also of the unhatched insect eggs. The Paris green of the mixture together with the insoluble calcium salts remaining after the chlorine has been set free, forms on the leaves and other portions of the plant a deposit which is destructive to insects which would otherwise feed on the plant.

While the composition described is particularly effective in destroying the boll weevil, where other insecticides have been found ineffective, it is equally effective as an insecticide for other insect pests on growing plants.

Having thus described my invention what I claim is:—

1. A composition of matter for use in destroying boll weevil and other insect life on growing plants consisting of a mixture of chloride of lime and Paris green.

2. A composition of matter for use in destroying boll weevil and other insect life on growing plants consisting of a mixture of chloride of lime and Paris green in the proportion of about one pint of Paris green to four pints of chloride of lime.

WILLIAM STAKELY COX.